(No Model.)

C. E. BOSS.
COLOR, FORM, AND NUMBER BOARD.

No. 414,371. Patented Nov. 5, 1889.

WITNESSES:
C. W. Benjamin
C. C. Van Santen

INVENTOR
Charles E. Boss

UNITED STATES PATENT OFFICE.

CHARLES E. BOSS, OF NORTH PLAINFIELD, NEW JERSEY.

COLOR, FORM, AND NUMBER BOARD.

SPECIFICATION forming part of Letters Patent No. 414,371, dated November 5, 1889.

Application filed February 9, 1887. Serial No. 227,006. (No model.)

*To all whom it may concern:*

Be it known that I, CHARLES E. BOSS, a citizen of the United States, residing at North Plainfield, in the county of Somerset and State of New Jersey, have invented a new and useful Educational Apparatus, of which the following is a specification.

My invention is designed for use in sub-primary and primary work, and may be used in various branches of that work. It is especially adapted for use in teaching color, number, and form; but it may also be used in teaching direction, position, spelling, and other subjects. Modern methods of teaching these subjects make use of objects for the purpose of presenting the subject to the eye of the pupil.

Figure 1:
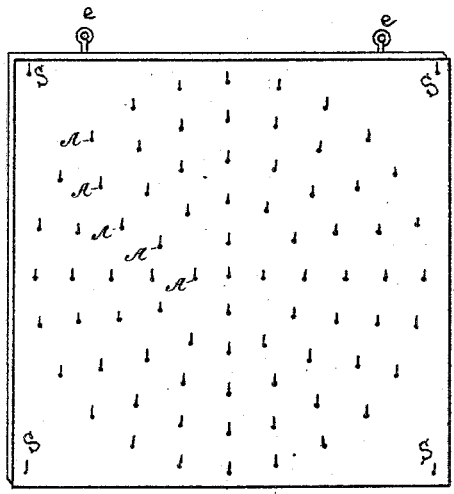
Figure 3:
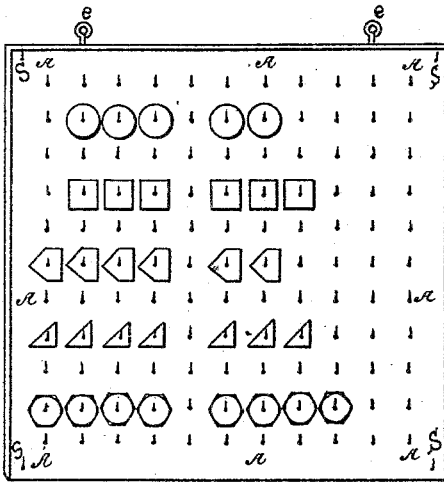
Figure 2:
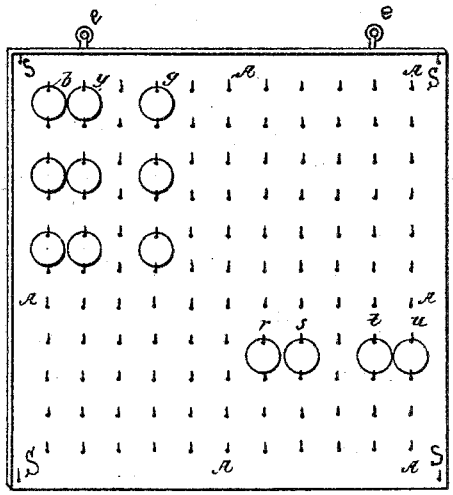

Referring to the drawings, Figures 1, 2, and 3 are perspectives of the two sides of the apparatus, the last two figures being of the same side.

Similar letters of reference indicate similar parts in all the figures of the drawings.

I accomplish this by means of the device illustrated in the accompanying drawings. It consists of a board B (about two feet square being a convenient size) so arranged as to be reversible, in order that both sides may be used. In each corner, on both front and rear, I drive or fix spikes or screws S S, protruding from the surface somewhat farther than the hooks, screws, or pegs hereinafter mentioned, and somewhat heavier, the purpose being to prevent the said hooks, screws, or pegs from becoming bent or broken as the board hangs against the wall. Upon one side of the board (called here the " front ") there are fixed or driven in horizontal parallel lines and in lines at right angles thereto brass or other screws, hooks, or pegs, Figs. 2 and 3, A A. Upon the other face (called here the "rear" face) similar hooks, screws, or pegs are arranged in concentric circles, or in the form of an ellipse, double curve, or other curved figures, if desired, Fig. 1, A A. The whole board thus arranged may be hung upon an arm or against the wall by means of two hooks or screw-eyes *e e,* screwed into the top; or it may be placed when in use upon a desk or table.

The accompanying drawing marked Fig. 1 represents the board hung against the wall with its rear face arranged so that the objects used will appear in the form of concentric circles toward the spectator. Upon these screws, hooks, or pegs A A, I arrange rings or circular, square, triangular, or other shaped figures or disks of convenient size, made of metal, pasteboard, papier-maché, or other substances, of colors to represent the three primary and the three secondary colors, and other colors if desired.

My device is used in the following manner for the purposes aforesaid:

I. *In teaching color.*—One ring of a primary color—say blue—is hung upon a hook of the board, the pupil being taught the name of the color, Fig. 2, *b.* At its immediate right is hung another primary color—say yellow— the pupil being taught the name of this color, Fig. 2, *y.* The pupil is then taught that by mixing these two colors a secondary color, green, is produced. This colored ring is then hung at the right of the other two, Fig. 2, *g,* and the pupil is taught the name of its color. The pupil is thus taught and has represented before him the proposition that " the mixture of blue and yellow gives green," and that "green is formed by mixing blue and yellow." Immediately below this three other colors are similarly arranged, and so on, as represented in the accompanying drawing marked Fig. 2. This arrangement of rings may be varied indefinitely. If desired, the tertiary colors may be similarly used. The board may also be used to exercise the pupil in selecting and matching the various colors.

II. *In teaching number.*—A ring of any color—say red—is placed upon the board, Fig. 2, *r.* At its right is placed another ring of the same or a different color, Fig. 2, *s,* the pupil being taught that one ring and one ring are two rings. On the second hook to the right of these two, leaving one hook vacant, is placed another ring, Fig. 2, *t,* the pupil being taught that one ring and two rings are three rings. On the hook at the right of these three rings is placed a fourth ring, Fig. 2, *u,* the pupil being taught that two rings and two rings are four rings, and so on. In this way addition of various numbers is taught and the work is represented to the eye, the work being varied and extended at pleasure. By reversing the process the subject of subtraction is taught and illustrated.

The accompanying diagram marked Fig. 3 shows how the following propositions are taught and illustrated to the eye: Three and two are five. Three and three are six. Four and two are six. Four and three are seven. Four and four are eight. In a similar way the subjects of multiplication and division may be taught and illustrated. Arabic figures printed upon circular or other shaped figures or disks may be placed upon the board in teaching number, if desired.

III. *In teaching form.*—For teaching this subject the rings are arranged upon the board in various forms, as square, oblong, triangle, right-angled triangle, and circle, the pupil being taught the names and exercised in forming those figures, and being taught the meaning of "diameter," "center," "radius," "diagonal," and other terms.

IV. *In teaching spelling.*—For this subject disks or other shaped figures bearing the different letters upon their face or attached thereto may be used and placed upon the board, forming words.

Various methods of teaching and illustrating primary work have been heretofore used, and I do not claim these as my invention, but only the device by which with one apparatus the various subjects may be taught and illustrated to the eye.

What I especially claim as new, and desire to secure by Letters Patent, is—

The herein-described educational appliance, consisting of the board B, the opposite surfaces of which are each provided with a series of uniformly-arranged projecting hooks adapted to receive educational objects, the suspending-eyes $e$, arranged at the upper end of the board, and the laterally-disposed abutting and spacing devices S, arranged upon each side and at the four corners of the board, substantially as specified.

CHARLES E. BOSS.

Witnesses:
PERCIVAL C. SMITH,
C. C. VAN SANTEN.